United States Patent Office.

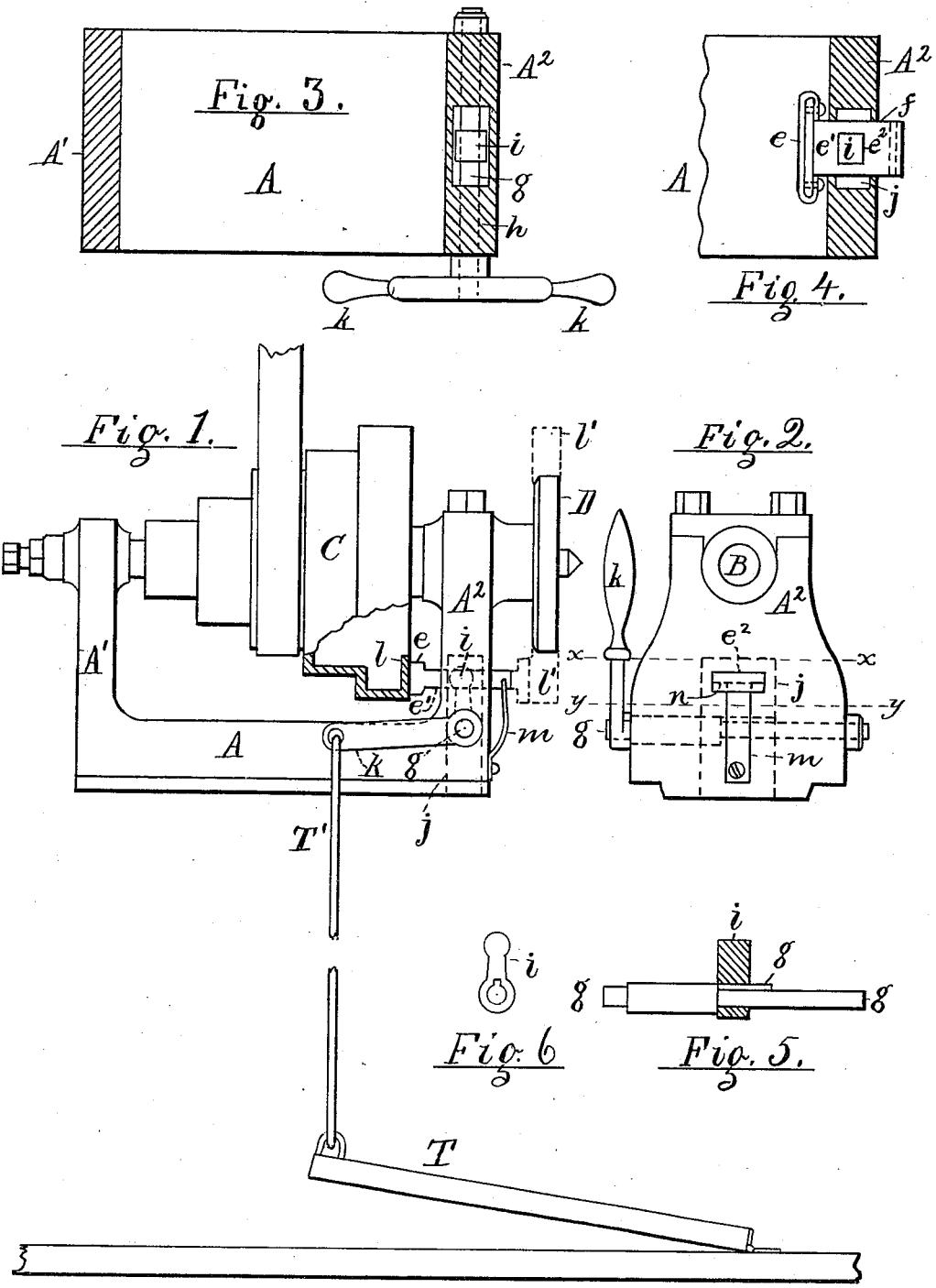

ULRICH EBERHARDT AND HENRY E. EBERHARDT, OF NEWARK, N. J.

LATHE FRICTION-BRAKE.

SPECIFICATION forming part of Letters Patent No. 308,347, dated November 25, 1884.

Application filed March 13, 1884. (No model.)

*To all whom it may concern:*

Be it known that we, ULRICH EBERHARDT and HENRY E. EBERHARDT, citizens of the United States, residing in Newark, Essex county, New Jersey, have invented certain new and useful Improvements in Lathe Friction-Brakes, fully described and represented in the following specification and the accompanying drawings, forming a part of the same.

This invention consists in the combination, with a pulley having a belt applied to its convex surface, of a flange, $l$, attached to its edge, a brake arranged to operate against such flange when the belt is on the rim of the pulley, and a lever constructed and operated to actuate the brake to and from the flange, as and for the purpose set forth.

It also consists in the combination of a spring with the same devices in such manner as to keep the brake away from the flange when the lever is not pressed by the operator, and in a special construction of a lathe head to receive the shank of the brake.

The invention is shown in the drawings as applied to a hand-lathe, because it is chiefly in such lathes that it is desirable to stop the lathe-spindle promptly when running at high speed; but the invention may be applied to any kind of lathe.

Figure 1 shows a side elevation of a lathe-head with a part of the cone-pulley broken away to show the friction-flange $l$. Fig. 2 is a front view of the same; Fig. 3, a sectional plan of the head without the spindle, on line $y\ y$ in Fig. 2. Fig. 4 is a similar section on line $x\ x$ in Fig. 2, to expose the shank of the brake $e$, the front end only of the head being shown. Fig. 5 is a detached view of the lever-shaft $g$, the crank $i$ being shown in section to expose the key $g'$. Fig. 6 is an end view of the crank.

A is the lathe-head, having back bearing, $A'$, and front bearing, $A^2$, in which the spindle B is fitted. C is the cone; D, the face-plate; $e$, the brake; $e'$, a bar extended through the front of the lathe-head and serving for its shank; $f$, a mortise in the front of the head for said shank; $e^2$, a slot in the shank; $i$, a crank mounted on a shaft, $g$, in bearings or sockets $h$ in the front of the head; $j$, a recess cored out in the same to receive the crank $i$, and $k$ a lever to operate the shaft and press the brake against the frictional surface. This surface is shown formed on a flange, $l$, flush with the front end of the cone, the larger speeds of the cone being shown in section in Fig. 1 adjacent to the brake, to show the inwardly-projecting flange. The movement of the brake is parallel with the spindle B, and the shaft $g$ is inserted transversely in the head through the recess $j$, which is formed in the casting below the front bearing, $A^2$. The crank is formed with a keyway, as shown in Fig. 6, and the shaft $g$ with a key, $g'$, so that when the crank is inserted in the recess its head may be fitted into the slot $e^2$ in the shank of the brake, and the shaft inserted in its bearings $h$ and in the crank simultaneously, thus locking the crank in its place. The outer end of the shaft being provided with an arm or handle of any kind, it is obvious that the brake may be readily pressed against the flange $l$ and the spindle quickly stopped.

The construction of the head with the mortise $f$ and the shank of the brake passing through it affords a means of applying the brake to the face-plate of the lathe, if desired.

By extending the edge of the face-plate, as indicated at the dotted lines $l'$ in Fig. 1, the brake may be formed upon the outer end of the shank $e'$ and the friction produced by pressure against such face-plate. In such case the handle or lever would of course be moved in the opposite direction to effect the desired pressure.

Three different kinds of levers are shown in the drawings to actuate the shaft and the brake, Fig. 2 showing an upright turned arm, $k$, Fig. 3 showing a hand-wheel provided with outer spokes, $k$, and Fig. 1 showing a lever-arm, $k$, connected with a treadle, T, by a rod, T', so that the operator can bring the brake into action by the use of his foot while the hands are otherwise engaged.

To press the brake away from the frictional surface when not in use, I have shown a spring, $m$, attached to the front of the lathe-head and fitted to a groove, $n$, in one end of the brake-shank $e'$. A spring of different form may be used—as, for instance, a spiral spring—and the same may be applied to the lever $k$, instead of the shank $e'$, provided that the brake be pressed away from the flange $l$ by such spring as described above for the spring $m$.

It will be seen from the above that the invention consists, primarily, in providing a belt-pulley having a belt applied to its rim, with a flange at one side, forming a disk-like surface for the application of a brake; and, secondly, in the combination, with a lathe-head, of a bar sliding through the front of the head parallel with the spindle to carry the brake. The first construction enables us to use any lathe-driving pulley to carry a friction-flange when the belt is on its rim, and the second affords the means of combining the brake with the lathe-head in the most compact manner.

We are aware that friction clutch and brake have been before combined with a cone not attached to the spindle, and do not therefore claim such a construction; but, Having distinguished our invention from such construction, we claim the same as follows:

1. In a brake for a lathe, the combination, with a pulley having a belt applied to its convex surface, of a flange, $l$, attached to its edge, a brake arranged to operate against such flange when the belt is on the rim of the pulley, and a lever constructed and operated to press the brake against the flange, as and for the purpose set forth.

2. In a brake for a lathe, the combination, with a pulley having a belt applied to its convex surface, of a flange, $l$, attached to its edge, a brake arranged to operate against such flange when the belt is on the rim of the pulley, a spring arranged to press the brake from the flange, and a lever constructed and operated to press the brake toward the flange, as and for the purpose set forth.

3. The combination, with the lathe-head A, of the mortise $f$, the shank $e'$, inserted movably in the mortise, the brake $e$, attached to the shank, and a lever, $k$, with suitable connection to the shank for operating the brake, substantially as shown and described.

In testimony whereof we have hereunto set our hands in the presence of two subscribing witnesses.

ULRICH EBERHARDT.
HENRY E. EBERHARDT.

Witnesses:
FRED L. EBERHARDT,
A. VAN ARSDALE.